United States Patent
Kachmarck et al.

(10) Patent No.: US 10,462,057 B1
(45) Date of Patent: Oct. 29, 2019

(54) SHAPING NETWORK TRAFFIC USING THROTTLING DECISIONS

(71) Applicant: Amazon Technologies, Inc., Seattle, WA (US)

(72) Inventors: Brian Kachmarck, Seattle, WA (US); Naveen Anand Subramaniam, Seattle, WA (US); Jacob Shannan Carr, Seattle, WA (US); Aaron Ben Fernandes, Redmond, WA (US); Gaurav Gupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 15/279,226

(22) Filed: Sep. 28, 2016

(51) Int. Cl.
| | |
|---|---|
| *H04L 12/803* | (2013.01) |
| *H04L 12/801* | (2013.01) |
| *H04L 5/00* | (2006.01) |

(52) U.S. Cl.
CPC ......... *H04L 47/122* (2013.01); *H04L 5/0055* (2013.01); *H04L 47/11* (2013.01)

(58) Field of Classification Search
None
See application file for complete search history.

(56) References Cited

U.S. PATENT DOCUMENTS

| | | | | |
|---|---|---|---|---|
| 6,477,143 B1* | 11/2002 | Ginossar | ................. | H04L 47/10 370/230 |
| 8,510,821 B1* | 8/2013 | Brandwine | ......... | H04L 63/1416 709/229 |
| 8,904,506 B1* | 12/2014 | Canavor | ................. | H04L 29/06 726/7 |
| 9,118,722 B1* | 8/2015 | Gershon | ................. | H04L 67/10 |
| 2012/0297405 A1* | 11/2012 | Zhang | .................... | H04H 20/08 725/9 |
| 2015/0334024 A1* | 11/2015 | Mogul | .................... | H04L 47/22 370/237 |
| 2015/0365328 A1* | 12/2015 | Luke | ..................... | H04L 47/125 370/238 |
| 2016/0164873 A1* | 6/2016 | Das | ........................ | H04L 63/10 707/784 |
| 2017/0019312 A1* | 1/2017 | Meyer | .................... | G06N 5/048 |
| 2017/0026461 A1* | 1/2017 | Boutros | ................. | H04L 67/101 |
| 2017/0257319 A1* | 9/2017 | Roch | ....................... | H04L 47/38 |
| 2017/0332270 A1* | 11/2017 | Gandhi | ............. | H04W 28/0236 |
| 2017/0359261 A1* | 12/2017 | Avci | ..................... | H04L 47/125 |

* cited by examiner

*Primary Examiner* — Chirag G Shah
*Assistant Examiner* — Srinivasa R Reddivalam
(74) *Attorney, Agent, or Firm* — Davis Wright Tremaine LLP

(57) ABSTRACT

A computing resource service provider may provide customers with access to various services provided by a set of service endpoints. During certain intervals of time increased network traffic may cause an increase in the consumption of computing resources of the set of service endpoints. A throttling trigger may be detected that may cause one or more routing devices to reroute network traffic to one or more lower tier routing devices. The lower tier routing devices may maintain throttling information and forward network traffic to the set of service endpoints.

20 Claims, 9 Drawing Sheets

SHAPING NETWORK TRAFFIC USING THROTTLING DECISIONS

BACKGROUND

A data center is a facility that houses computer systems and various networking, storage, and other related components. Data centers may, for example, provide computing services to businesses and individuals as a remote computing service or provide infrastructure, platforms, or software as a service. To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are in frequent communication with each other. Balancing customer access to the computing resources and keeping the system secure becomes more challenging as the complexity and usage of the system increases. In such distributed computing systems, it can be difficult to identify the vulnerabilities of the system. Furthermore, it can also be difficult to isolate and troubleshoot issues with the system, and even when issues are identified, reliably distributing the resources of the system may be challenging. Additionally, many conventional systems rely upon manual mitigation of toxic traffic and exhaustion of computing resources.

Providing remote services in a cost-effective manner can be challenging. For instance, a computing resource service provider can use the same hardware to support multiple resources. While, on average, the hardware may be able to support the resource usage demand of multiple customers, there can be points at which overloading occurs, such as when multiple virtual machines simultaneously have increased utilization of limited hardware resources. The computing resources that provide services to customers may employ various techniques to protect the computing resources from an overwhelming number of service requests that could potentially overload the computing resources. In general, a computing resource, such as a physical host, is considered to be in an "overloaded" state if it is not able to provide a defined level of capacity for at least some measure of capacity (e.g., CPU cycles, network bandwidth, latency, etc.) for at least some portion of customer requests it receives. Furthermore, different hardware and software configurations of the computing resources used to provide remote program execution and remote data storage may affect performance and degradation of the computing resources during intervals of heavy utilization. It may be difficult for the computing resource service provider to determine customers, attackers, or traffic patterns causing heavy resource utilization.

BRIEF DESCRIPTION OF THE DRAWINGS

Various techniques will be described with reference to the drawings, in which.

DETAILED DESCRIPTION

Figure 1:
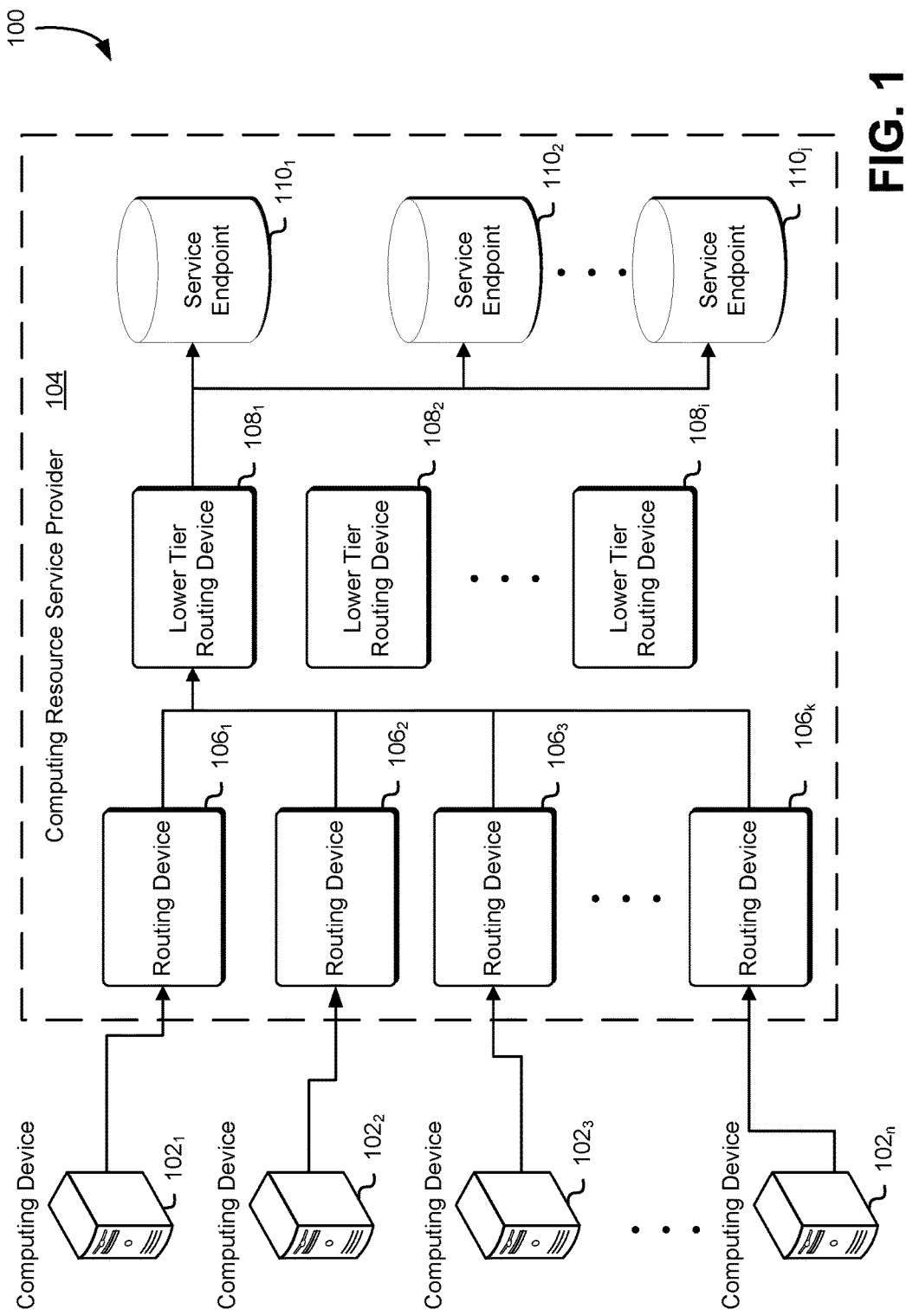
FIG. 1 illustrates an environment in which network topology may be dynamically modified by providing a lower tier routing device on a network route between a customer and a service endpoint in accordance with an embodiment.

In various examples described below, a throttling service detects a trigger indicating that a particular service endpoint is under duress or otherwise overloaded as a result of network traffic. In response, the throttling service dynamically modifies a network topology to reduce load on the service endpoint and isolate "toxic" network traffic (e.g., a particular type or pattern of network traffic consuming resources of the service endpoint). In general, a customer may not consume the entire portion of the computer system's resources allocated or available to the customer. In some instances, such as when hardware devices (e.g., physical hosts) are used to support computing resources for multiple customers, the hardware devices may become overloaded when multiple customers attempt to consume a larger portion of computing resources available to the customers at the same time. Customers include any computing device consuming resources of the service endpoint. To prevent exceptions and/or errors which may occur when there is insufficient computing resource capacity to fulfill customer requests, various techniques are used to dynamically modify one or more customer's network route to a particular service endpoint (e.g., hardware device used to process customer requests).

The throttling service manages one or more routing devices which may be configured as a fleet of routing devices that distributes customer requests to one or more service endpoints responsible for servicing the particular requests. When a particular service endpoint provides a throttling trigger, described in greater detail below, the network traffic directed to the particular service endpoint may be divided and/or sub-divided based at least in part on one or more dimensions or attributes of the network traffic. The divided and/or sub-divided network traffic may be routed to a lower tier routing device. In addition, network edges between the lower tier routing devices and the routing devices may be assigned a weight based at least in part on a variety of parameters such as cache or customer information. The lower tier routing device may be instantiated, and routing information may be updated such that network traffic having the one or more attributes is directed to the lower tier routing device. Any number of lower tier routing devices may be instantiated and network traffic may be rerouted or otherwise directed to any one or any combination of lower tier routing devices thereby modifying network topology.

The lower tier routing devices then make various throttling decisions and collect information to determine a specific type and/or pattern of network traffic causing the service endpoints to be overloaded or otherwise causing exhaustion of computing resources. The network traffic may be received from a specific source or may be received from one or more indistinguishable or unidentified sources. For example, the network traffic may be received from a particular host computer system or may be received from a plurality of attackers. Furthermore, the throttling service may collect information associated with throttling decisions made by the lower tier routing devices and/or routing devices and determine one or more additional attributes of the network traffic which may be used to divide and/or sub-divide. In some embodiments, this process may be iterative as the throttling service modifies the one or more attributes used to divide the network traffic, receives throttling information, and further modifies the one or more attributes used to divide the network traffic.

The throttling service or components thereof, such as the routing devices, may identify a source of network traffic or a pattern of network traffic causing over consumption of service endpoint computing resources that may lead to exhaustion of those resources. Once the source or pattern is identified, network traffic associated with the source or pattern is rerouted to a particular lower tier routing device which then counts and identifies traffic and makes throttling decisions. For example, a particular customer may have a host that, as a result of an error, is transmitting hundreds of requests per second. This may cause the service endpoint to provide the routing device a throttling trigger and, as a result, network traffic associated with the particular customer is then directed to a lower tier routing device, and if the number of requests violates a throttling policy, the requests may be throttled. In another example, an attacker may attempt a distributed denial of service attack (DDoS) which may cause a service endpoint to provide a throttling trigger. The throttling service may determine a pattern associated with the attack and cause network traffic matching the pattern to be routed to one or more lower tier routing devices.

The solutions within the scope of the present disclosure provide various technical advantages including increased speed, reliability, resiliency, and efficiency of computing resources as well as lower recovery time when computing resources become overloaded.

In the preceding and following descriptions, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider 104 may receive and route customer requests utilizing one or more routing devices $106_{1-k}$ to direct customer traffic to the appropriate service endpoints $110_{1-j}$. In addition, the computing resource service provider may operate one or more lower tier routing devices $108_{1-i}$ which may be used to dynamically modify network topology and throttle customer requests as needed. As illustrated by FIG. 1, the computing resource service provider 104 may provide computing devices $102_{1-n}$ with access to one or more computing resources provided through the service endpoints $110_{1-j}$. As described in greater detail below, the computing resource service provider 104 may operate host computer systems organized into one or more data centers. The host computer systems may provide computing resources to execute various entities, such as the lower tier routing devices $108_{1-i}$, the service endpoints $110_{1-j}$, or routing devices $106_{1-k}$. For example, the routing devices $106_{1-k}$ may be virtual devices executed using computing resources of a host computer system.

The service endpoints $110_{1-j}$ include one or more computing resources (e.g., physical computing resources, virtual computing resources, and/or distributed computing resources) that implements a service accessible via a network address associated with the service. Note that the service endpoints $110_{1-j}$ could comprise multiple devices (e.g., a combination of physical or virtual devices), such as when the network address corresponds to a load balancer that routes traffic to a plurality of redundant servers.

As illustrated in FIG. 1, customer requests may be received at various routing devices $106_{1-k}$ and directed to a lower tier routing device $108_1$ before being forwarded on to the service endpoints $110_{1-j}$. The various routing devices $106_{1-k}$ may use various techniques for routing network traffic from computing devices $102_{1-n}$ to the various service endpoints $110_{1-j}$. For example, the routing devices $106_{1-k}$ may use a consistent hash ring or other mechanism to route network traffic such that the routing devices $106_{1-k}$ consistently route the similar network traffic (e.g., from the same customers and/or computing devices or consistent with a known traffic pattern) to the same service endpoint. For example, a unique customer identification number may be hashed and the resulting hash key may be within a particular range associated with a particular service endpoint which causes the various routing devices $106_{1-k}$ to route network traffic including the unique customer identification number to the particular service endpoint.

Furthermore, the computing resource service provider 104 may provide a variety of services to the computing devices $102_{1-n}$ and the computing devices $102_{1-n}$ may communicate with services of the computing resource service provider 104 by transmitting requests which may be directed to the routing devices $106_{1-k}$. While FIG. 1 shows a plurality of the routing devices $106_{1-k}$ of the computing resource service provider 104, each service endpoint may have its own routing devices $106_{1-k}$ and, generally, subsets of the service endpoints may have corresponding routing devices $106_{1-k}$ in addition to or as an alternative to the routing devices $106_{1-k}$ illustrated in FIG. 1. In addition, the computing devices $102_{1-n}$ may connect or may be connected to multiple routing devices $106_{1-k}$ simultaneously or near simultaneously. Similarly, the routing devices $106_{1-k}$ may have a plurality connection with and/or receive a plurality of requests from one or more computing devices $102_{1-n}$ at any given interval of time. The computing devices $102_{1-n}$ may be organizations that may utilize one or more of the services provided by the computing resource service provider 104 to maintain and deliver information to its employees or customers, which may be located in various geographical locations.

Additionally, the computing devices $102_{1-n}$ may include an individual that utilizes the services of the computing resource service provider 104 to preform various operations. Not shown in FIG. 1 for simplicity, the computing devices $102_{1-n}$ may communicate with the computing resource service provider 104 through a network whereby the network may be a communication network, such as the Internet, an intranet or an Internet service provider (ISP) network. Some communications from the computing devices $102_{1-n}$ to the computing resource service provider 104 may cause the computing resource service provider 104 to operate in accordance with one or more embodiments described or a variation thereof. In various embodiments, the computing devices $102_{1-n}$ include other services or computing resources operated by the computing resource service provider 104 or other entity. In yet other embodiments, the computing devices $102_{1-n}$ include various entities directing network traffic to the service endpoints $110_{1-j}$, such as attackers attempting a DDoS.

The computing resource service provider 104 may provide various computing resources to the computing devices $102_{1-n}$. The services provided by the computing resource service provider 104 may include a virtual computer system service, a block-level data storage service, a cryptography service, an on-demand data storage service, a notification service, an authentication system, a policy management service, a task service, and one or more other services. It is noted that not all embodiments described include the services described above, and additional services may be provided in addition to or as an alternative to services explicitly described.

As described above, in a multi-tenant environment during periods of increased activity, computing resources may become overloaded which may lead to a decrease in availability and an increase in latency of the computing resources to process requests on behalf of the customer. Increased latency may violate the terms of a service-level agreement (SLA). An SLA may be part of a service contract or other agreement between a computing resource service provider 104 and the computing devices $102_{1-n}$ where a particular service is formally defined. Particular aspects of the service (e.g., scope, quality, responsibilities, latency, availability) may be agreed on between the computing resource service provider and the customer.

In order to avoid such scenarios, the service endpoints $110_{1-j}$ may provide a throttling trigger, described in greater detail below, which causes the routing devices $106_{1-k}$ to route network traffic, based at least in part on one or more attributes, to the lower tier routing devices $108_{1-i}$. The throttling trigger may indicate "back pressure" from the service endpoint $110_{1-j}$. For example, back pressure may include the service endpoints $110_{1-j}$ returning a negative acknowledgment for a particular request. In another example, the routing devices $106_{1-k}$ may detect back pressure as a result of one or more requests timing out. In some embodiments, the service endpoints $110_{1-j}$ identify the network traffic causing the service endpoints $110_{1-j}$ to become overloaded and indicate the network traffic as toxic traffic in the throttling trigger. For example, the throttling trigger may indicate a particular customer or type of request that is causing degradation of service and/or excessive utilization of computing resources of the service endpoints $110_{1-j}$.

As a result of receiving the throttling trigger, one or more routing devices $106_{1-k}$ may cause network traffic to be routed to a particular lower tier routing device such as the lower tier routing device $108_1$ illustrated in FIG. 1. The lower tier routing devices $108_{1-i}$ may be virtual computing resources, physical computing resources, or a combination thereof. For example, the lower tier routing device $108_1$ may be a virtual computer system instance supported by a virtualization layer (e.g., a hypervisor) executed by physical computing resources such as a server computer system. In various embodiments, the lower tier routing devices $108_{1-i}$ may be instantiated using the same virtual machine images as the routing devices $106_{1-k}$, although the operation and/or functionality of the lower tier routing devices $108_{1-i}$ may be extended or otherwise different from the routing devices $106_{1-k}$. For example, as described in greater detail below, the lower tier routing devices $108_{1-i}$ may be responsible for determining additional information associated with received network traffic and implementing a throttling policy based at least in part on the additional information.

In various embodiments, the lower tier routing devices $108_{1-i}$ increment a counter upon receiving a request and each lower tier routing device $108_{1-i}$ may maintain a separate counter. The counter may represent a number of requests received during an interval of time, and the requests may be associated with a particular attribute or set of attributes of the one or more attributes, as described above. For example, the counters may represent the number of requests received from a particular customer or computing device. If a received request or counter value does not violate a throttling policy, the lower tier routing device $108_{1-i}$ may forward requests to the service endpoints $110_{1-j}$. Therefore, under normal conditions (e.g., computing resources are not overloaded or under duress) the routing device may route requests directly to the service endpoint (e.g., one network hop to the service endpoint). A network hop may include transmission of network traffic to any device that receives the network traffic and routes the traffic towards a destination. For example, the lower tier routing devices $108_{1-i}$ are considered a network hop because the lower tier routing devices $108_{1-i}$ receive network traffic and direct the network traffic to the service endpoints $110_{1-j}$ (in addition to other operations described below). However, when a service endpoint transmits a throttling trigger, a particular routing device will reroute network traffic associated with the service endpoint to a particular lower tier routing device which will then track the number of requests received over an interval and route the requests to the service endpoint.

If the number of requests received is greater than a threshold value or otherwise violates a throttling rule, the request may be throttled. Throttling includes a variety of mechanisms for slowing network traffic (e.g., request). In various embodiments, the network traffic is throttled by virtue of the additional network hop added in the network path between the computing devices $102_{1-n}$ and the service endpoints $110_{1-j}$ created by rerouting the network traffic to the lower tier routing devices $108_{1-i}$. Other examples of a throttling mechanism include queuing requests, dropping network traffic (e.g., dropping packets), or routing requests to additional intermediaries.

The lower tier routing devices $108_{1-i}$ may maintain a set of throttling rules or throttling policy that indicates when network traffic is to be throttled. For example, if the counter is above a threshold value any subsequent request may be throttled. In another example, requests may be throttled if, after providing an initial throttling trigger, the service endpoints $110_{1-j}$ continue to provide throttling triggers. Various feedback control algorithms may be used to determine whether to continue throttling a particular portion of the network traffic (e.g., requests associated with particular request attributes). For example, an additive-increase/multiplicative-decrease (AIMD) algorithm may be used to determine throttling information such as duration and whether to throttle. Under the AIMD algorithm, w(t) represents the transmit rate during time interval t. If a particular lower tier routing device determines not to throttle traffic, based at least in part on the throttling policy, then w(t+1)=w(t)+a where a>0. However, if a particular lower tier routing device determines to throttle traffic based at least in part on the throttling policy, then $(t+1)=w(t)\times b$ where b>0. This may combine linear growth of the congestion window with an exponential reduction when throttling takes place. Other schemes include multiplicative-increase/multiplicative-decrease (MIMD) and additive-increase/additive-decrease (AIAD).

Although a computing resource service provider environment is illustrated in FIG. 1, the techniques described may be used in a plurality of environments. For example, the techniques described may be used to route requests between computing resources within a home network environment, corporate network environment, or other network environment with a finite amount of computing resources.

Figure 2:
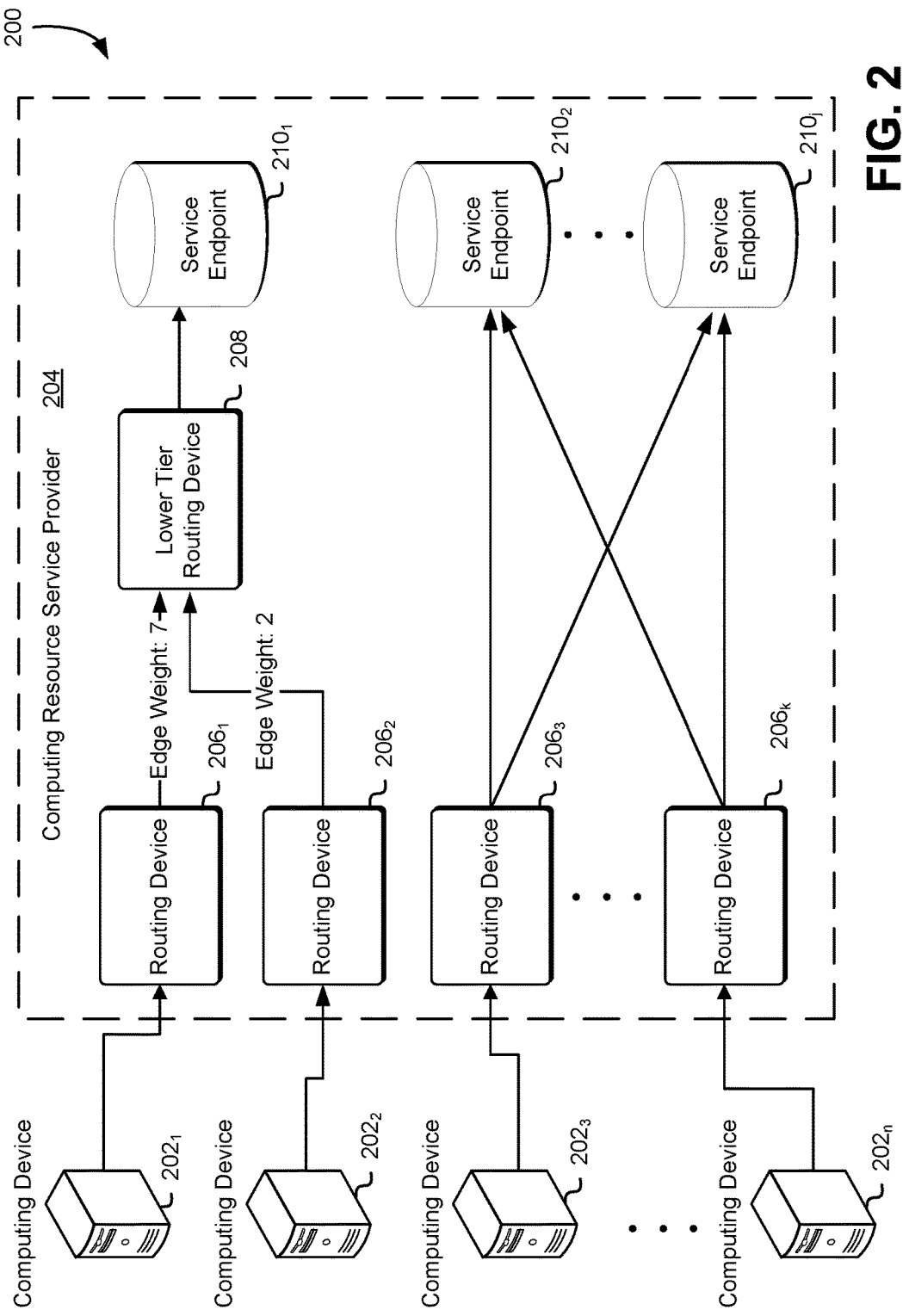
FIG. 2 illustrates an environment in which network topology may be dynamically modified by providing a lower tier routing device on a network route between a customer and a service endpoint in accordance with an embodiment.

FIG. 2 illustrates an environment 200 in which a computing resource service provider 204 may receive and route network traffic utilizing one or more routing devices $106_{1-k}$ to direct customer traffic to the appropriate service endpoints $210_{1-j}$. In addition, the computing resource service provider may operate a lower tier routing device 208 which may be used to dynamically modify network topology and throttle customer requests as needed. As illustrated by FIG. 2, the computing resource service provider 204 may provide computing devices $202_{1-n}$ with access to one or more computing resources provided through the service endpoints $210_{1-j}$. As described in greater detail below, the computing resource service provider 204 may operate host computer systems organized into one or more data centers. The host computer systems may provide computing resources to execute various entities. For example, the routing devices $206_{1-k}$ may be virtual devices executed using computing resources of a host computer system.

As illustrated in FIG. 2, customer requests (e.g., network traffic) may be received at various routing devices $206_{1-k}$ and directed to a lower tier routing device 208 before being forwarded to one or more service endpoints $210_{1-j}$. The various routing devices $206_{1-k}$ may direct all or a portion of the network traffic received to the lower tier routing device 208. For example, the routing devices $106_{1-k}$ determine one or more attributes of the network traffic such as customer information, IP address, and request type and direct traffic to the lower tier routing device 208 based at least in part on the one or more attributes. As described in greater detail below, a throttling management system in some embodiments is responsible for providing to the routing devices $206_{1-k}$ information indicating which attribute(s), if present in network traffic, causes the network traffic to be directed to the lower tier routing device 208. In yet other embodiments, a throttling trigger provided by the service endpoint $210_1$ indicates which attribute(s), if present in network traffic, causes the network traffic to be directed to the lower tier routing device 208.

The various routing devices $206_{1-k}$ may use various techniques for routing network traffic from computing devices $202_{1-n}$ to the various service endpoints $210_{1-j}$. For example, the routing devices $206_{1-k}$ may use a consistent hash ring or other mechanism to route network traffic such that the routing devices $206_{1-k}$ consistently route the similar network traffic (e.g., from the same customers or consistent with a known traffic pattern) to the same service endpoint. For example, a unique customer identification number may be hashed and the resulting hash key may be within a particular range associated with a particular service endpoint which causes the various routing devices $206_{1-k}$ to route network traffic, including the unique customer identification number, to the particular service endpoint.

A consistent hashing mechanism utilizes hashing such that when a hash table is resized, only K/n keys need to be remapped on average, where K is the number of keys, and n is the number of slots in the hash table. Other examples of routing include routing tables, static routing, or dynamic routing. In various embodiments, the requests may be hashed using a unique (relative to the service endpoints) customer identification number. In addition, the multiple keys may be hashed to determine a routing endpoint. For example, the customer identification number and identification of the service endpoint may be combined and hashed to determine routing information. In addition, any other routing technique that causes requests with the same dimension to be routed to the same service endpoint may be used in connection with the present disclosure.

In one example, all network traffic that is routed to the service endpoint $210_1$ (when under duress) is rerouted to the lower tier routing device 208. The network traffic may be rerouted based at least in part on customer information (e.g., an attribute of the network traffic) included in the network traffic. The routing devices $206_{1-k}$ may modify the routing information based at least in part on the one or more attributes of the network traffic to be directed to the lower tier routing device 208. For example, when using a consistent hash ring as described above, routing devices $206_{1-k}$ modify a hash key associated with the one or more attributes (e.g., a hash of the customer identification number and request type) such that the hash key maps network traffic to the lower tier routing device 208. As described in greater detail below, the one or more attributes used to separate network traffic and direct network traffic to the lower tier routing device 208 may be modified over various intervals to determine a particular type or pattern of network traffic causing degradation of service at the service endpoints $210_{1-j}$.

In addition to the routing as described above, the routing devices 2061-k may assign and/or obtain edge weight information as illustrated in FIG. 2. The network edges (e.g., the network path between two or more devices on a network) may be assigned an edge weight based at least in part on a variety of parameters. The edge weight may be calculated using a function including the parameters as a set of inputs, where the edge weight is an output of the function. Various functions that assign a value to one or more parameters may be used to determine an edge weight to assign to a particular network edge. For example, different routing devices 2061-k may each be located in a different data center; as a result, the routing devices 2061-k may assign edge weights to various network edges to bias communications within the same data center as the particular routing device is located.

In some embodiments, the edge weight is fixed based at least in part on the network topology. Alternatively, the edge weight and network topology may be dynamically modified to route network traffic to the lower tier routing device 208 or other network devices in response to or in an attempt to prevent back pressure from the service endpoint $210_{1-j}$. For example, based at least in part on an amount of network traffic received at the service endpoint $210_{1-j}$, the routing devices $206_{1-k}$ may modify the edge weights such that the network traffic travels a less than ideal network path (e.g., avoid network congestions), thereby delaying the network traffic to avoid overloading the service endpoint $210_{1-j}$. Various routing and path finding algorithms may use the edge weight information to route network traffic to various computing resources, such as the lower tier routing device 208. These algorithms include maximum flow algorithms and Dijkstra's algorithm.

The routing devices $206_{1-k}$ may initially set the network topology based at least in part on a particular computing device (e.g., the computing device responsible for transmitting the request) and a particular service endpoint (e.g., the service endpoint responsible for processing the request). As described above, the network topology may be determined based at least in part on edge weights assigned for various network paths. The edge weights may be determined based at least in part on various parameters such as where the network traffic was received from, where the network traffic is directed to, a customer associated with the network traffic, a computing device that transmitted the network traffic, a type of the network traffic, a priority associated with the network traffic, or other attributes of the network traffic suitable for assigning edge weights and/or differentiating network traffic. In addition, the edge weights may be dynamically modified to re-route various kinds of network traffic (e.g., toxic network traffic or non-toxic network traffic). Furthermore, the routing devices $206_{1-k}$ and lower tier routing device 208 may assign or calculate different weights for the same network edge or network device. For example, as illustrated in FIG. 2, routing devices $206_1$ and routing devices $206_2$ have assigned different edge weights to the lower tier routing device 208. Determination of the edge weight may be as a result of detecting back pressure. For example, a particular routing device may recalculate the edge weight for various network edges along the path to a particular service endpoint based at least in part on detecting a throttling trigger from the particular service endpoint.

Furthermore, the computing resource service provider 204 may provide a variety of services to the computing devices $202_{1-n}$, and the computing devices $202_{1-n}$ may communicate with services of the computing resource service provider 204 by transmitting a request which may be directed to the routing devices $206_{1-k}$. While FIG. 2 shows a plurality of the routing devices $206_{1-k}$ of the computing resource service provider 204, each service endpoint may have its own routing device $206_{1-k}$ and, generally, subsets of the service endpoints may have corresponding routing devices $206_{1-k}$ in addition to or as an alternative to the routing devices $206_{1-k}$ illustrated in FIG. 2. The computing devices $202_{1-n}$ may be organizations that may utilize one or more of the services provided by the computing resource service provider 204 to maintain and deliver information to its employees or computing devices, which may be located in various geographical locations.

As illustrated in FIG. 2, the routing devices $206_{1-k}$ may direct traffic to a plurality of service endpoints $210_{1-j}$. Furthermore, the service endpoints $210_{1-j}$ may be part of a plurality of different services offered by the computing resource service provider 204. Each service endpoint may provide computing devices $202_{1-n}$ with access to one particular service or multiple services. For example, service endpoint $210_1$ may provide customers and computing devices with access to computing resources of an on-demand storage service. In another example, service endpoint $210_1$ may provide customers with access to computing resources of an on-demand storage service and a virtual computing system service.

Figure 3:
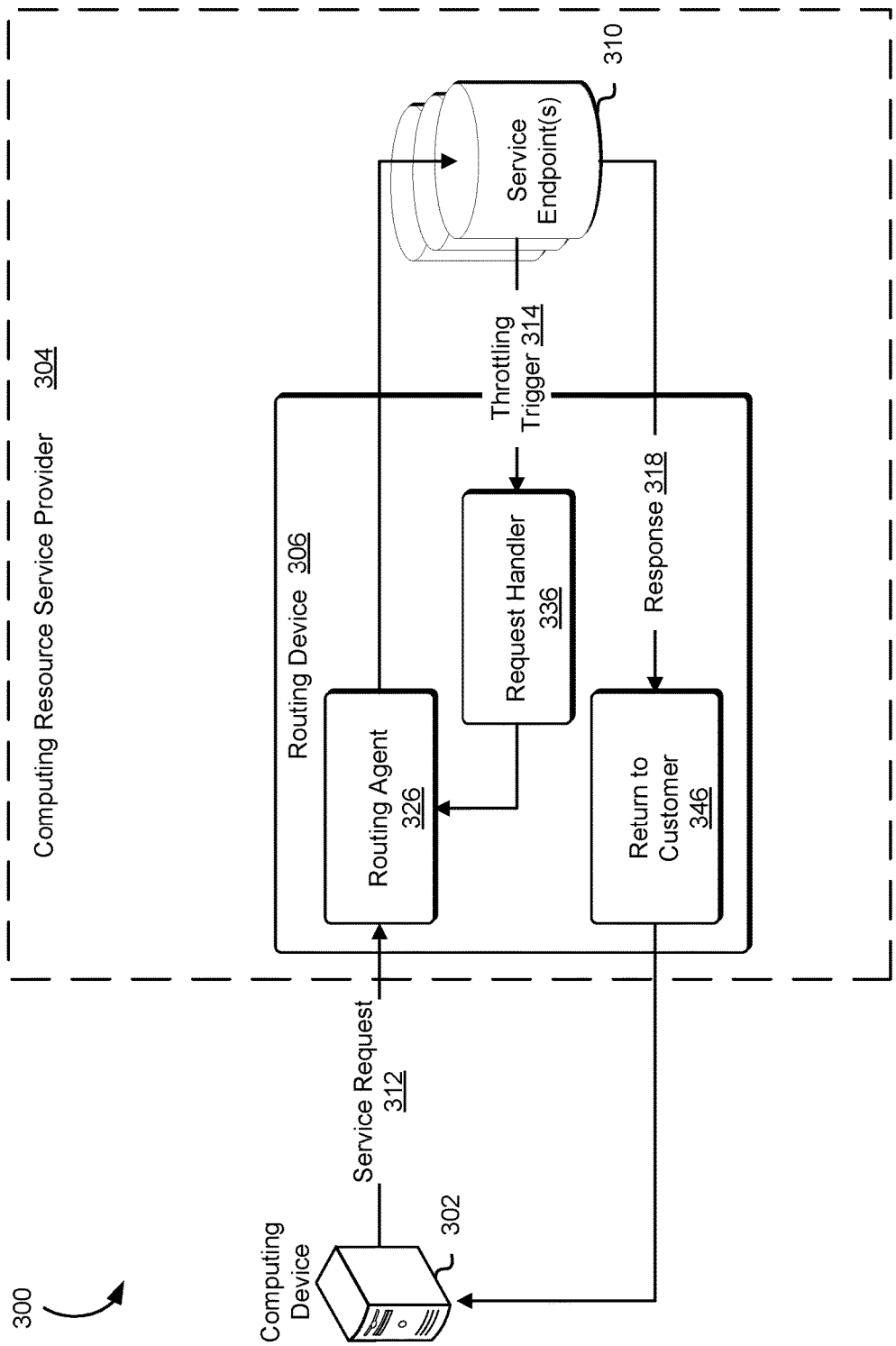
FIG. 3 illustrates an environment in which a routing device may receive a throttling trigger from a service endpoint in accordance with an embodiment.

FIG. 3 illustrates an environment 300 in which a computing resource service provider 304 may receive and route service requests 312 from a computing device 302 utilizing a routing device 306 to direct customer traffic to the appropriate service endpoints 310. The routing device 306 may include various routing devices including physical computing resources executing a set of instructions that cause the underlying physical compute resources to perform various operations. Furthermore, the routing device 306 may include a routing agent 326, a request handler 336, and a return to customer 346.

The routing agent 326 may include software or other executable instructions that, as a result of being executed by one or more processors, causes physical computing resources implementing the routing device 306 to perform a variety of functions as described below. Specifically, the routing agent 326 may be responsible for maintaining routing information, determining a particular route or service endpoint 310 associated with the service request 312 or other network traffic received at the routing device 306. As described above, the routing agent 326 may use a consistent hash ring, a routing table, or other routing mechanism to determine and direct network traffic to the appropriate endpoint. For example, the routing agent 326 may hash customer identification information included in the service request 312 and match the result to a range within the consistent hash ring, the range corresponding to a particular service endpoint designated for processing and/or fulfilling the service request 312.

The request handler 336 may include software or other executable instructions that, as a result of being executed by one or more processors, causes physical computing resources implementing the routing device 306 to perform a variety of functions. Specifically, the request handler 336 may receive a throttling trigger 314 from one or more service endpoints 310. The throttling trigger may include a variety of signals, triggers, notifications, or combination thereof, as described above, indicating an increased consumption of computing resources of the service endpoints 310. The service endpoint 310 may provide the throttling trigger 314 directly to the request handler 336. In addition, an intermediary, such as a throttle management system, may detect the throttling trigger 314 and provide the throttling trigger 314 to the request handler 336. In yet other embodiments, the request handler 336 may obtain the throttling trigger 314 from the service endpoint 310. For example, the request handler 336 detects a timeout interval associated with a request transmitted to the service endpoint 310 to process the service request 312 has expired.

The throttling trigger 314 may include an indication of "back pressure" from the service endpoints 310. For example, back pressure may include the service endpoints 310 returning a negative acknowledgement for the service request 312. In another example, the request handler 336 or other component of the routing device, such as the return to customer 346, may detect back pressure as a result of one or more requests timing out. In some embodiments, the service endpoints 310 identify the network traffic causing the service endpoints 310 to become overloaded and indicate the service request 312 as toxic traffic in the throttling trigger 314. For example, the throttling trigger 314 may indicate a particular customer or type of service request that is causing degradation of service and/or excessive utilization of computing resource of the service endpoints 310. This information may also be determined by the routing device or the throttle management system based at least in part on the throttling trigger 314. For example, a network interface of the service endpoint may be overloaded such that the network interface may not be able to determine information associated with the network traffic (e.g., the service request 312). The routing device or the throttle management system may then determine identifying information of the toxic traffic.

In some embodiments, the request handler 336 determines the one or more attributes used to reroute network traffic based at least in part on the throttling trigger 314. For example, the request handler 336 may determine to reroute the customer's service request 312 to a lower tier routing device based at least in part on the throttling trigger 314. The request handler may then indicate to the routing agent 326 to reroute all of the customer's service requests 312 to the lower tier routing device. The routing agent 326 may then update routing information to cause the customer's service request 312 to be directed to the lower tier routing device.

The return to customer 346 may include software or other executable instructions that, as a result of being executed by one or more processors, causes physical computing resources implementing the routing device 306 to perform a variety of functions. Specifically, the return to customer 346 provides a response 318 to the service request 312 to the computing device 302. The return to customer 346 may determine the computing device 302 based at least in part on information included in the response 318, such as customer identification information.

Figure 4:
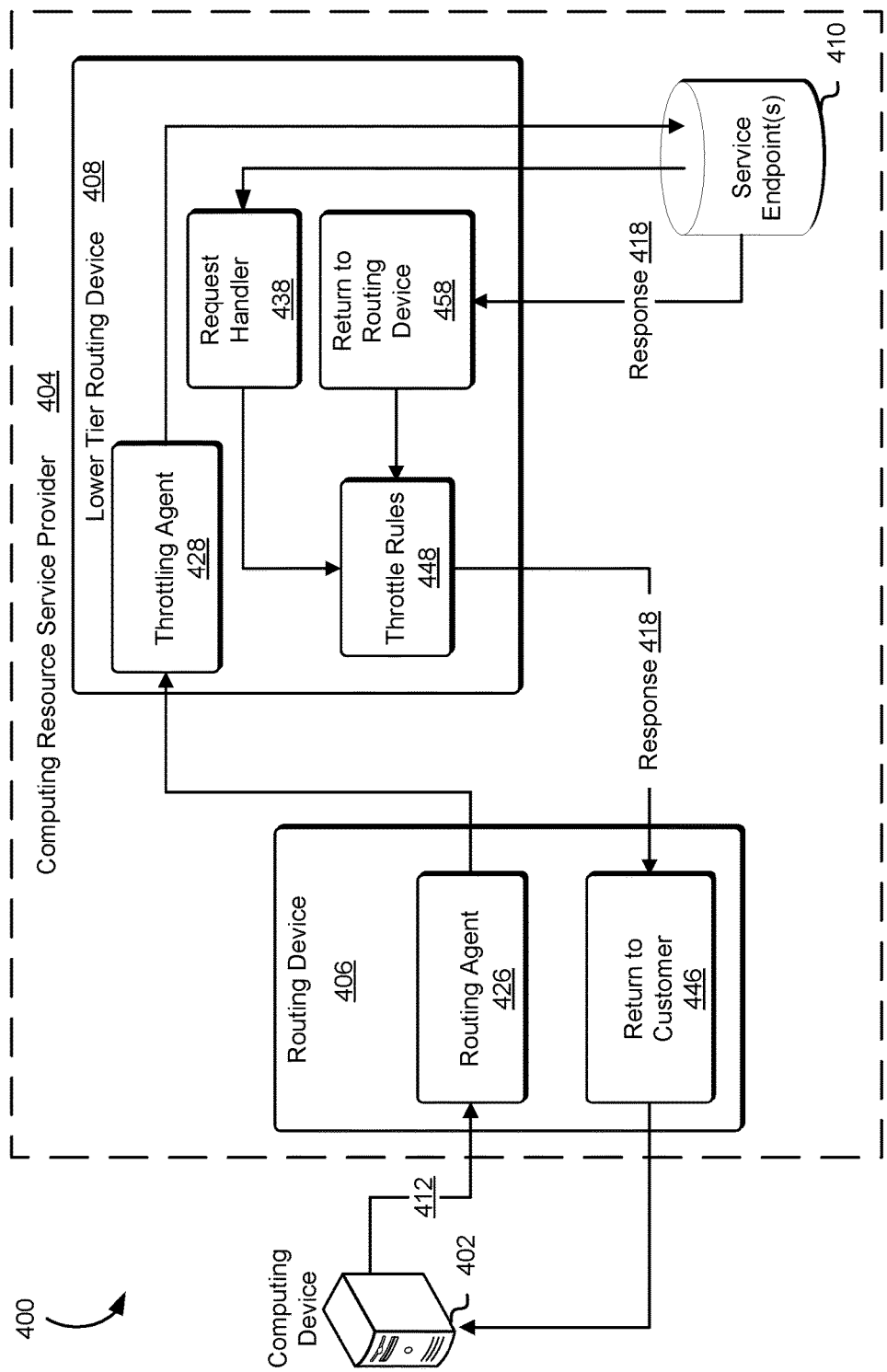
FIG. 4 illustrates an environment in which network topology may be dynamically modified as a result of receiving a throttling trigger in accordance with an embodiment.

FIG. 4 illustrates an environment 400 in which a computing resource service provider 404 may receive and route service requests 412 from a computing device 402 utilizing a routing device 406 to direct customer traffic to the appropriate lower tier routing device 408 before being forwarded on to a service endpoint 310. The routing device 406 and lower tier routing device 408 may include various devices including physical computing resources executing a set of instructions that cause the underlying physical compute resources to perform various operations. Furthermore, the routing device 406 may include a routing agent 426 and a return to customer 446, as described in greater detail above in connection with FIG. 3. Furthermore, the lower tier routing device 408 may include a throttling agent 428, a request handler 438, a return to routing device 458, and a set of throttle rules 448.

The routing agent 426 may include software or other executable instructions that, as a result of being executed by one or more processors, cause physical computing resources implementing the routing device 406 to perform a variety of functions. Specifically, the routing agent 426 may be responsible for maintaining routing information or determining a particular lower tier routing device to direct the service request 412 to. As illustrated in FIG. 4, the lower tier routing device 408 is used to provide an additional network hop between the routing device 406 and the service endpoints 410.

As described above, the lower tier routing device 408 may be used as a result of the routing device 406 detecting a throttling trigger. The routing device 406 or component thereof, such as the routing agent 426, may cause service requests 412 to be rerouted to the lower tier routing device 408 based at least in part on one or more attributes of the service requests 412. Although the service requests illustrated in FIG. 4 are rerouted to the lower tier routing device 408 in various embodiments, the routing agent 426 only reroutes a portion of the service requests 412 received at the routing device 406. For example, only service requests 412 of a certain type (e.g., read requests, write requests, service requests, or other request types) may be rerouted to the lower tier routing device 408. The type of the service requests 412 may be considered an attribute of the service request 412 for the purposes of the present disclosure.

The throttling agent 428 may include software or other executable instructions that, as a result of being executed by one or more processors, cause physical computing resources implementing the lower tier routing device 408 to perform a variety of functions. Specifically, the throttling agent 428 may receive service requests 412 and provide the service requests to the appropriate service endpoint 410. The throttling agent 428 may use any of the routing mechanisms described above, such as those described above in connection with FIG. 3. For example, the throttling agent 428 may utilize a consistent hash ring to map or otherwise associate attributes of the service request 412 with particular service endpoints. In addition, the throttling agent 428 may throttle particular service requests based at least in part on the set of throttle rules 448 and/or a throttling policy. For example, the throttle rules 448 may indicate that a particular set of network traffic (e.g., a portion of all the network traffic isolated and routed to the lower tier routing device 408 based at least in part on attributes of the network traffic) is above a certain threshold and, as a result, the throttling agent 428 may throttle additional network traffic received.

The throttling agent 428 may receive multiple streams of network traffic or portions thereof. For example, the throttling agent 428 may receive all the network traffic from the computing device 402, or all the network traffic from a particular host operated by the customer, or the all read requests received from the computing device 402. In addition, the throttling agent 428 may throttle the network traffic utilizing a feedback control algorithm such as AIMD. In various embodiments, if the number of service requests 412 received at the lower tier routing device 408 exceeds a threshold during an interval of time, any additional service requests received are throttled. Throttling requests may include various techniques such as queuing requests or dropping requests.

The request handler 438 may include software or other executable instructions that, as a result of being executed by one or more processors, causes physical computing resources implementing the lower tier routing device to perform a variety of functions. Specifically, request handler 438 may receive a throttling trigger from one or more service endpoints 410. The throttling trigger may include a variety of signals, triggers, notifications, or combination thereof, as described above, indicating an increased consumption of computing resources of the service endpoints 410. The service endpoint 410 may provide the throttling trigger directly to the request handler 438 as a result of receiving the service request from the lower tier routing device 408.

In some embodiments, the request handler 438 determines the one or more attributes used to isolate network traffic which may be toxic based at least in part on the throttling trigger. For example, the request handler 438 may determine that the service requests 412 associated with the computing device 402 are causing the service endpoint 410 to become overloaded and therefore may be considered toxic traffic. The request handler 438 may then indicate to the throttle rules 448 that particular network traffic or attributes of the particular network traffic are considered toxic traffic. The throttle rules 448 may then be updated to reduce the load on the service endpoint 410.

As described in greater detail below, the throttling rules 448 may be modified based at least in part on the throttling trigger, lack of throttling trigger, or a feedback control algorithm. For example, if a portion of the network traffic is isolated and rerouted to the lower tier routing device 408 based at least in part on one or more attributes of the network traffic but the service endpoint continues to be overloaded, the throttling rules 448 may modify the one or more attributes used to determine what portion of the network traffic to reroute to the lower tier routing device 408. In another example, the computing device 402 has one host computer system sending a large amount of network traffic, a particular type of service request 412, or a pattern of network traffic (e.g., backfilling data) that is causing a degradation of service at the service endpoint 410. The throttle rules 448 may isolate the particular network traffic by causing the attribute used to reroute the network traffic to be changed. In addition, if modification of the one or more attributes causes an overinclusion of network traffic (e.g., toxic and non-toxic network traffic), the throttle rules 448 or other system may cause the one or more attributes to be modified to reduce the impact on non-toxic traffic.

The return to routing device 458 may include software or other executable instructions that, as a result of being executed by one or more processors, causes physical computing resources implementing the lower tier routing device 408 to perform a variety of functions. Specifically, the return to routing device 458 provides a response 418 to the service request 412 to the routing device which may in turn provide the response 418 to the computing device 402. In various embodiments, the return to routing device 458 may provide the response 418 directly to the computing device 402.

Figure 5:
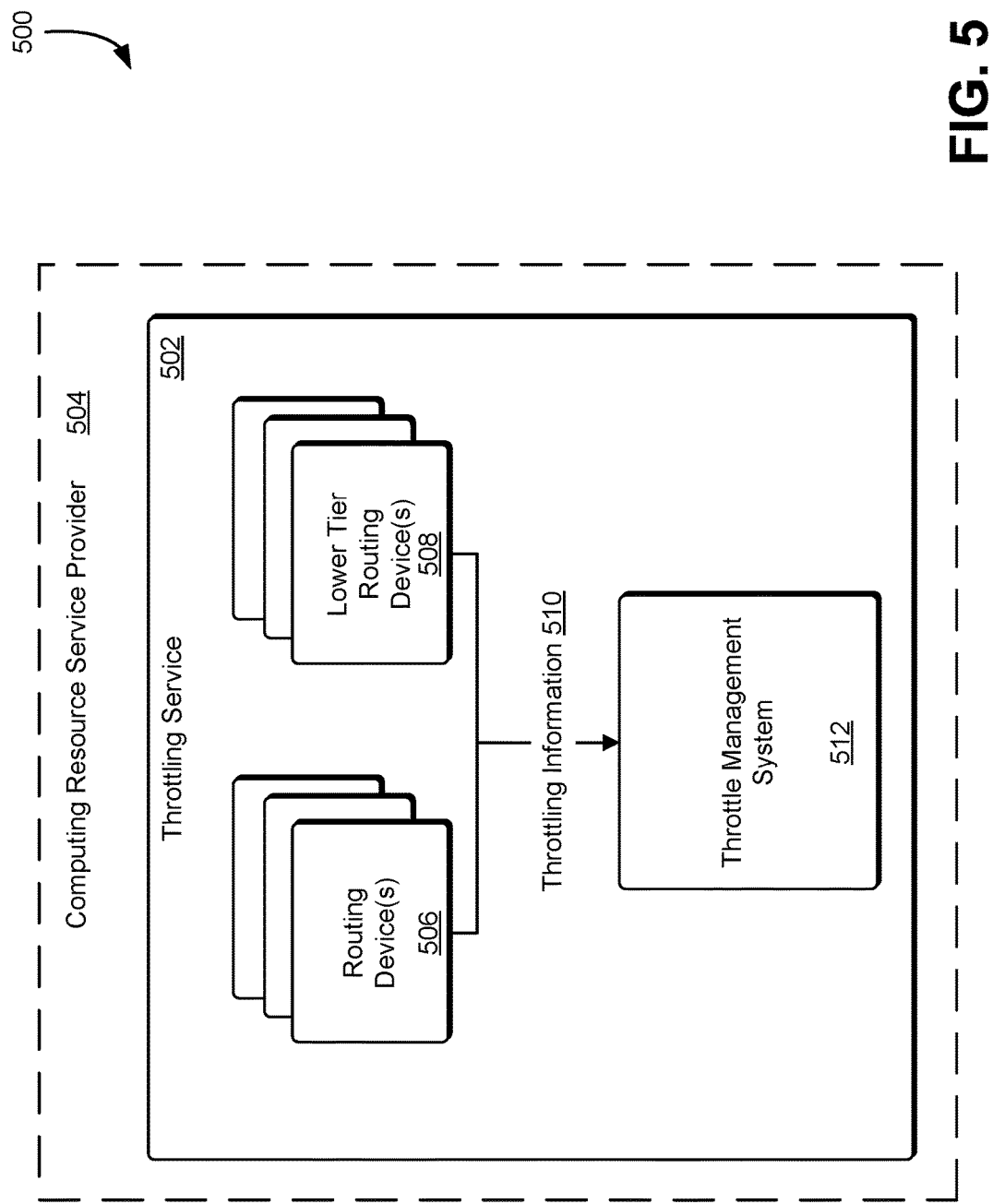
FIG. 5 illustrates an environment in which a throttling service may be used to dynamically modify network topology in accordance with an embodiment.

FIG. 5 illustrates an environment 500 in which a computing resource service provider 504 may provide a throttling service 502 to dynamically modify a network topology in response to a throttling trigger generated at least in part by a service endpoint. The throttling service 502 may include a plurality of host computer systems executing software or other executable instructions that, as result of being executed by one or more processors of the host computer systems, causes the host computer systems to implement the throttling service 502 as described below. The throttling service may include a throttle management system 512 which may obtain throttling information 510 from routing devices 506 and lower tier routing devices 508. The routing devices 506 and the lower tier routing devices 508 may include any of the devices described above in connection with FIGS. 1-4.

In addition, the throttle management system 512 may include a collection of computing devices, such as host computer systems described above, that perform management operations for the throttling service 502. The management operations include a variety of operations such as updating a throttle rule set or throttling policy, modifying routing information, instantiating lower tier routing devices 508 and routing devices 506, detecting throttling triggers, modifying attributes used to partition traffic, or any other operation required to dynamically modify a network topology.

The throttling information 510 may include a number of requests received at the routing devices 506 and/or lower tier routing devices 508 over an interval of time. For example, the lower tier routing devices 508 may include a counter which is incremented when the lower tier routing device 508 receives a service request. The counter information may be included in the throttling information 510 and the throttle management system 512 may use the counter information to modify the operation of the lower tier routing devices 508 and/or the routing devices 506. In some instances the throttling information 510 may be stale or otherwise nonrepresentative of the most current information determined by the routing devices 506 and lower tier routing devices 508. Therefore, in some embodiments, it may be beneficial to make throttling devices at the routing devices 506 and lower tier routing devices 508 because the throttling information that is used to make the throttling decisions is more representative of the current state of the computing resources involved in routing and processing network traffic.

The throttle management system 512 may also utilize various machine learning algorithms and mechanisms for tracking throttling information 510 and making throttling decisions. The machine learning algorithms may include a variety of algorithms including supervised and unsupervised machine learning algorithms. The machine learning algorithms may be used to determine the one or more attributes used to identify toxic traffic and reroute traffic by the routing devices. In addition, the machine learning algorithms may be used to update feedback control algorithms as well as throttling rules and/or throttling policy. In some embodiments, the throttling information 510 may include customer information and customer network activity. This throttling information may be provided to the machine learning algorithms to determine if the customer's activity has changed or otherwise become toxic. For example, over the last month the customer averaged 100 requests a day and over the last minute the customer has sent 1000 requests. This may indicate that the customer's traffic has now become toxic and may cause the service endpoint to become overloaded.

Figure 6:
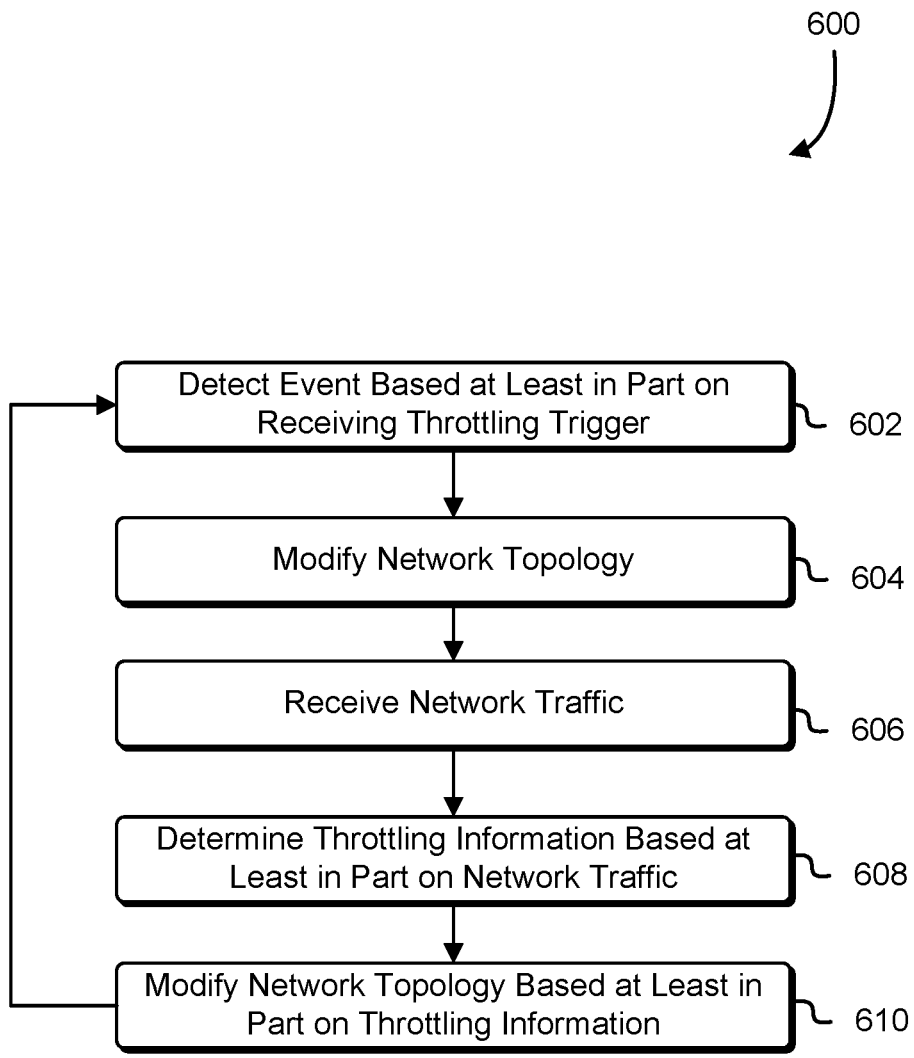
FIG. 6 illustrates an example process for dynamically modifying network topology between a customer and a service endpoint in accordance with an embodiment.

FIG. 6 is a block diagram illustrating an example of a process 600 for dynamically modifying network topology between a computing device and a service endpoint in accordance with at least one embodiment. The process 600 may be performed by any suitable system such as a routing device and/or lower tier routing device as described above in connection with FIGS. 1-5. The process 600 includes detecting an event based at least in part on receiving a throttling trigger 602. As described above, various routing devices and lower tier routing devices may distribute network traffic to various service endpoints. The service endpoints may provide a throttling trigger in response to being overloaded (e.g., receiving more network traffic than the service endpoint can process over an interval of time). The service endpoint may include computing resources of one or more services that process and/or fulfill the request. The various routing devices and lower tier routing devices may route network traffic based at least in part on a routing table, consistent hash ring, or other routing information.

The event may include various scenarios under which the service endpoints may be considered under duress and provide a throttling trigger as a result. For example, duress may be determined based at least in part on a throttling trigger received at one or more routing devices. The routing device may receive a negative acknowledgment or other indication that a particular service endpoint cannot process a request routed from the routing device to the particular service endpoint. The routing device may then maintain information indicating that the particular service endpoint is under duress. In addition or in the alternative, the routing device may update routing information associated with the particular service endpoint, causing requests routed to the particular service endpoint to be rerouted to a lower tier routing device.

Returning to FIG. 6, if the service endpoint is under duress, the system executing the process 600 may then modify the network topology 604. As described above, a lower tier routing device may be instantiated to reroute and process the network traffic. Furthermore, the routing information maintained by the routing devices may be updated to cause network traffic to be rerouted to the lower tier routing device or other destination on the network. For example, all of the customer requests routed to the service endpoint are rerouted to the lower tier routing device. The customer request may be rerouted to the lower tier routing device based at least in part on one or more attributes of the customer request. As another example, an edge weight associated with various network edges may be assigned or recalculated to modify the network topology and reroute the network traffic to the lower tier routing device or other network destination.

The system executing the process 600 may then receive network traffic 606. For example, a set of requests may be transmitted over a network as described above. Network traffic may be received at the lower tier routing device for some interval of time during which throttling information associated with the network traffic may be obtained. For example, the lower tier routing device may use a counter to count a number of requests included in the network traffic. Multiple counters may be used to count different request types, such as requests from different customers, read requests, write requests, requests to a particular service, or other information that may be used to differentiate requests. In numerous variations of the process 600, the lower tier routing device may then determine if the request is whitelisted. The request may be whitelisted based at least in part on type, customer or other entity associated with the request, or any other attribute associated with the request. For example, the request may be whitelisted based at least in part on an operation to be performed in fulfilling the request. In another example, the request may be whitelisted based at least in part on a number of attempts to fulfill the request or an age or timestamp associated with the request. The whitelist may be maintained by the lower tier routing device and managed by the throttle management system. If the request is whitelisted, the request may be transmitted to the service endpoint as described above. However, if the request is not whitelisted (e.g., one or more attributes of the request do not match information included in the whitelist), the lower tier routing device may update throttling information.

Returning to FIG. 6, the system executing the process 600 may then determine throttling information based at least in part on the network traffic 608. Throttling information may include a variety of information as described above. For example, the lower tier routing device increments a counter associated with the one or more attributes. The throttling information may also include throttling triggers received from the service endpoints. In this manner, if the service endpoints provide a throttling trigger, the network topology may be modified in order to increase an availability of the service endpoints. Updating throttling information may also include determining a customer associated with the request, determining a pattern associated with the request, determining a type associated with the request, determining congestion information associated with the request, determining if the service endpoint is still under duress, or any other information associated with throttling requests.

The lower tier routing device may, in some embodiments, throttle the request. Throttling the request may include queuing the requests or discarding one or more requests. Once the request is throttled, the lower tier routing device may transmit the request to the service endpoint as described above. In numerous variations to the process 600, the lower tier routing device may simply throttle the requests, transmitting the requests to the service endpoint. The additional network hop and routing operations may create enough delay to reduce the impact of the requests on the service endpoints.

Once the throttling information is determined, the system executing the process 600 may then modify the network topology based at least in part on the throttling information 610. For example, a particular routing device may reroute all of the network traffic from a set of computing devices to a lower tier routing device. As a result of determining throttling information based at least in part on the rerouted network traffic, the routing device, lower tier routing device, and/or throttle management system may determine that only a subset of the computing devices are causing the service endpoint to transmit a throttling trigger. Therefore, the routing device, lower tier routing device, and/or throttle management system may modify the network topology such that the subset of computing devices are no longer rerouted to the lower tier routing device or are otherwise delayed by the network topology. Similarly, the system executing the process 600 may modify the network topology to increase the number of network hops and/or routing devices (e.g., lower tier routing devices) the network traffic is directed to prior to being received by the service endpoint.

Furthermore, the system executing the process 600 may loop or otherwise iterate through the process 600 and continue to modify network topology. For example, the system executing the process 600 may detect another event or detect the continuation of a previously detected event based at least in part on receiving the same or a new throttling trigger and return to step 602. The system executing the process 600 may, in this manner, add constraints on network traffic, lower constraints on network traffic, modify network topology, or otherwise shape or alter one or more dimensions on network traffic. For example, the edge weights between one or more routing devices and/or lower tier routing devices may be modified. In another example, a number of lower tier routing devices (e.g., second tier, third tier, fourth tier, etc.) may be added. The system executing the process 600 selects from and/or switches between various network configurations, for example, such as the network configurations illustrated in FIGS. 1 and 2. The process 600 enables various computing systems to sample network traffic and determine various operations to perform in order to prevent service endpoints from being overloaded, increase performance of service endpoints, increase resiliency and responsiveness of service endpoints, and avoid degradation of service endpoints.

Figure 7:
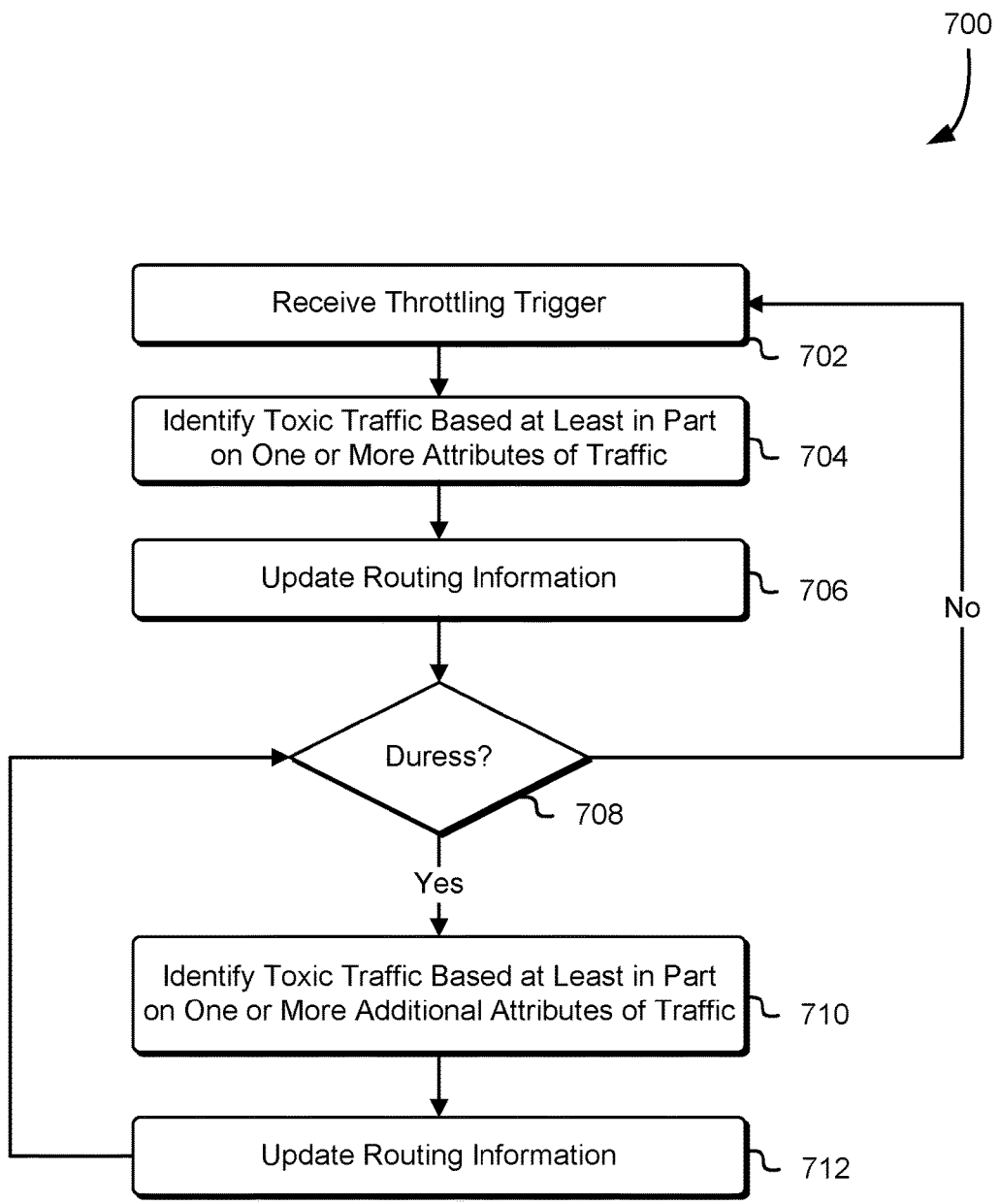
FIG. 7 illustrates an example process for identifying toxic traffic and dynamically modifying network topology between a customer and a service endpoint in accordance with an embodiment.

FIG. 7 is a block diagram illustrating an example of a process 700 for identifying toxic traffic and dynamically modifying network topology between a customer and a service endpoint based at least in part on one or more attributes of the toxic traffic in accordance with at least one embodiment. The process 700 may be performed by any suitable system such as a routing device and/or lower tier routing device as described above in connection with FIGS. 1-5. The process 700 includes receiving a throttling trigger 702. The throttling trigger may include a variety of triggers as described above. For example, a service endpoint may transmit an indication to a routing device that the computing resources of the service endpoint are exhausted.

The system performing the process 700 may then identify toxic traffic based at least in part on one or more attributes of the network traffic 704. Toxic traffic may include network traffic as described above that causes the service endpoints to become overloaded and/or exhausted. Examples of toxic traffic include various network attack patterns, customers transmitting a large number of requests over a small interval of time, or any network traffic that exceeds the capacity of the computing resources of the service endpoint. The toxic traffic may be identified based at least in part on an attribute of the network traffic. For example, an IP address or other identification information included in the network traffic may be used to identify the toxic traffic.

The system performing the process 700 may then update routing information 706. For example, updating the routing information includes updating a consistent hash ring such that the attribute of the network traffic identified as toxic is directed to a lower tier routing device. As described above, other routing mechanisms may be used in accordance with the present disclosure. The system performing the process 700 may then determine if the service endpoint is under duress 708. Duress may be determined based at least in part on a throttling trigger received at one or more routing devices and/or lower tier routing devices. For example, a routing device may receive a negative acknowledgment or other indication that a particular service endpoint cannot process a request routed from the routing device to the particular service endpoint. If the service endpoint is not under duress, then the system executing the process 700 may determine that the toxic traffic was identified correctly and wait to receive an additional throttling trigger 702. However, if the service endpoint is still under duress, the system executing the process 700 may identify toxic traffic based at least in part on one or more additional attributes of the network traffic 710. For example, the network traffic may be identified based at least in part on an IP address included in the network traffic and a type of request included in the network traffic.

The system performing the process 700 may then update routing information 712. The routing information may be updated as described above. Once the routing information is updated, the system executing process 700 may then determine if the service endpoint is still under duress 708. In this manner the system executing the process 700 may iteratively determine a source and/or cause of the toxic traffic and correctly identify the toxic traffic. In numerous variations to the process 700, the system executing the process 700 may update the routing information once the service endpoint is no longer under duress such that the routing device routes to the service endpoints directly and no longer reroutes network traffic to the lower tier routing devices. Furthermore, the system executing the process 700 may modify the attributes used to identify the toxic traffic by adding or removing multiple attributes in a single iteration used to identify the toxic traffic.

Figure 8:
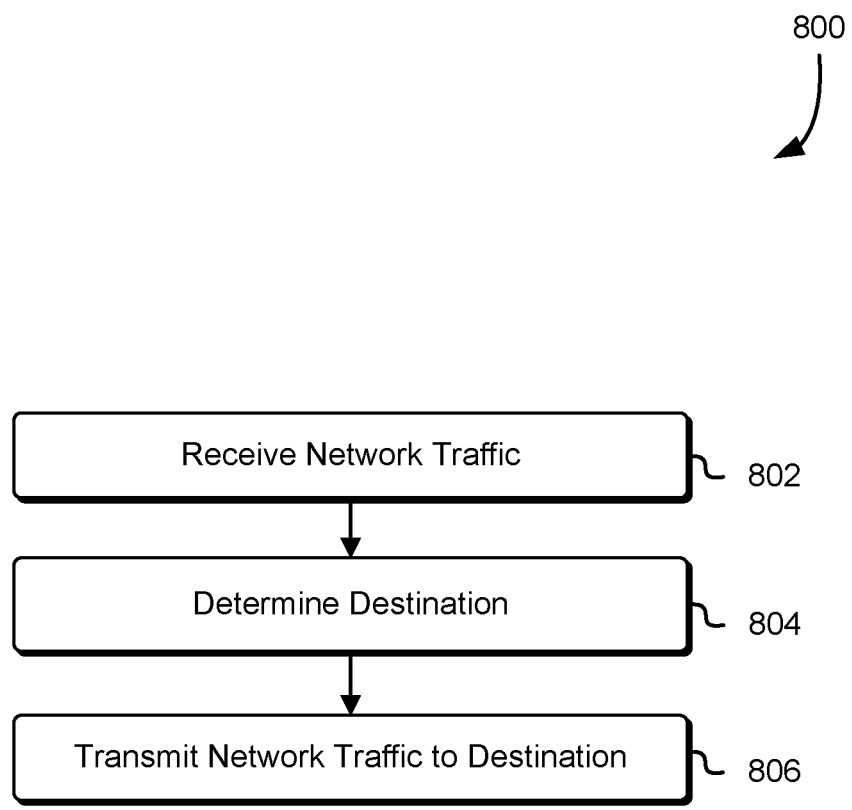
FIG. 8 illustrates an example process for routing network traffic in accordance with an embodiment.

FIG. 8 is a block diagram illustrating an example of a process 800 for routing network traffic in accordance with at least one embodiment. The process 800 may be performed by any suitable system such as a routing device and/or lower tier routing device as described above in connection with FIGS. 1-5. The process 800 includes receiving network traffic 802. The network traffic may include service requests transmitted from computing resources as described above. The network traffic may include a variety of information which may be used to determine a service endpoint and customer associated with the network traffic.

The system executing the process 800 may then determine a destination 804 associated with the network traffic. As described above, the destination may be determined based at least in part on a hash ring or routing table. For example, a customer identification number included in the request may be hashed to determine a particular service endpoint associated with the request. Furthermore, the destination may be determined based at least in part on a variety of other information such as edge weights, throttling information, or other information associated with the network topology information maintained by the system executing the process 800. For example, the system executing the process 800 may determine the destination of the network traffic is a lower tier routing device based at least in part on a set of edge weights assigned to the network paths connected to the system executing the process 800. Once a destination is determined, the system executing the process 800 may transmit the network traffic to the destination 806. Transmitting the network traffic to the destination may include transmitting the network traffic along a network path to a particular computing resource.

Figure 9:
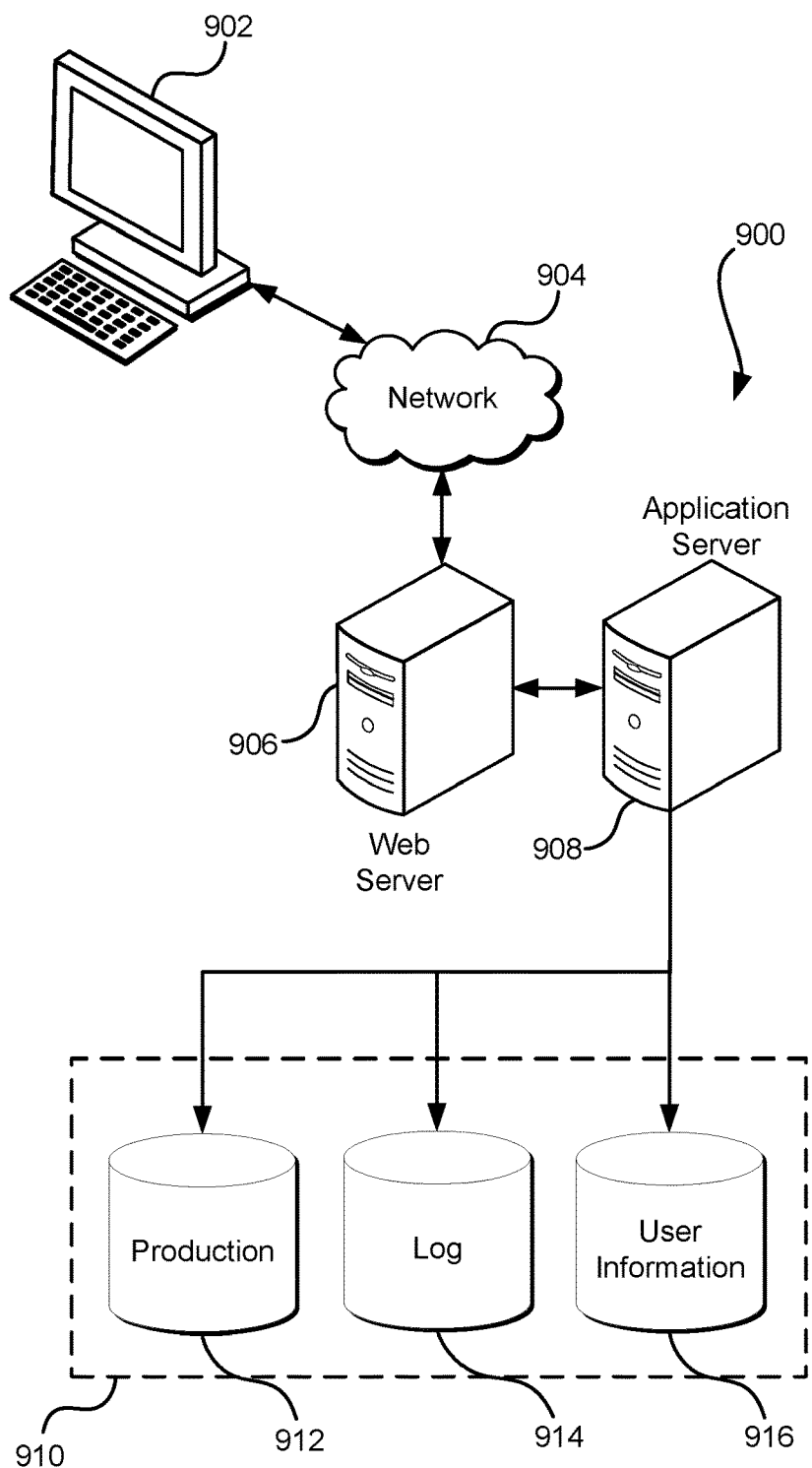
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting a throttling trigger from a service endpoint indicating that computing resources of the service endpoint are overloaded;
    updating routing information of a routing device based at least in part on the throttling trigger, the routing information routing network traffic based at least in part on one or more attributes of a set of requests included in the network traffic such that the set of requests is rerouted to a set of lower tier routing devices;
    obtaining a request of the set of requests at the routing device, fulfillment of the request involving computing resources of the service endpoint;
    determining one or more attributes of the request;
    rerouting the request to a first lower tier routing device of the set of lower tier routing devices based at least in part on the routing information indicating that the request is to be rerouted to the set of lower tier routing devices as a result of the request including the one or more attributes of the request;
    updating, by the first lower tier routing device, throttling information based at least in part on the request;
    providing the request to the service endpoint; and
    generating an update to the routing information of the routing device based at least in part on the throttling information obtained from the first lower tier routing device, the update as a result of being applied to the routing information modifying at least one attribute of the one or more attributes such that the routing information causes the routing device to route a second request of the set of requests to a second lower tier routing device of the set of lower tier routing devices based at least in part on the second request including the at least one attribute.

2. The computer-implemented method of claim 1, wherein the one or more attributes of the request further comprises customer identification information included in the request.

3. The computer-implemented method of claim 1, wherein updating the throttling information further comprises incrementing a counter in response to obtaining the request at the lower tier routing device, the counter indicating a number of requests obtained at the lower tier routing device over an interval of time.

4. The computer-implemented method of claim 1, wherein the routing information further comprises a consistent hash ring that maps a hash of the one or more attributes of the request to a destination; and
    wherein updating the routing information of the routing device further comprises modifying a hash key of a consistent hash ring such that the hash of the one or more attributes of the request indicates the request should be routed to the lower tier routing device.

5. A system, comprising:
    at least one computing device implementing one or more services, wherein the one or more services:
        detect a throttling trigger generated by a service endpoint;
        update a network topology based at least in part on detecting the throttling trigger and a set of attributes of network traffic;
        cause network traffic to be directed to a lower tier routing device of a set of lower tier routing devices based at least in part on the network topology;
        update throttling information based at least in part on network traffic obtained at the lower tier routing device; and
        modify the network topology based at least in part on the throttling information by at least generating an application programming interface call that, as a result of being received by a routing device causes the routing device to direct additional network traffic to at least one other lower tier routing device of the set of lower tier routing devices based at least in part on one or more attributes.

6. The system of claim 5, wherein the at least one computing device throttles network traffic based at least in part on the throttling information and a set of throttle rules.

7. The system of claim 6, wherein updating the throttling information further includes incrementing a counter; and
wherein the set of throttle rules further includes a throttle rule indicating that if the counter is above a threshold, network traffic is to be throttled.

8. The system of claim 6, wherein throttling network traffic further includes dropping network traffic.

9. The system of claim 6, wherein throttling network traffic further includes using a feedback control algorithm to throttle network traffic.

10. The system of claim 9, wherein the feedback control algorithm further includes an additive-increase/multiplicative-decrease (AIMD) algorithm.

11. The system of claim 5, wherein updating the network topology further comprises assigning an edge weight to one or more network edges within the network topology, the edge weight modifying a determination of a network path between the lower tier routing device and at least one other computing device.

12. The system of claim 5, wherein the set of attributes further includes at least one attribute indicating a request included in network traffic is a read request; and
wherein updating the network topology further includes updating routing information such that requests including the at least one attribute are routed to the lower tier routing device and write requests are routed to the service endpoint.

13. A set of one or more non-transitory computer-readable storage media storing thereon executable instructions that, as a result of being executed by one or more processors of a computer system, cause the computer system to:
obtain a throttling trigger from a service endpoint;
modify a network topology by at least determining one or more attributes of network traffic associated with the throttling trigger and updating routing information such that network traffic including at least one attribute of the one or more attributes is provided to a first lower tier routing device of a set of lower tier routing devices and network traffic that does not have the at least one attribute of the one or more attributes is provided to the service endpoint;
provide network traffic to the first lower tier routing device based at least in part on the one or more attributes;
update throttling information based at least in part on information associated with the network traffic and obtained from the first lower tier routing device; and
modify the network topology based at least in part on the throttling information by at least generating an application programming interface call that, as a result of being received by routing device causes the routing device to direct additional network traffic to a second lower tier routing device of the set of lower tier routing devices based at least in part on the one or more attributes.

14. The set of one or more non-transitory computer-readable storage media of claim 13, wherein the instructions further comprise instructions that, as a result of being executed by the one or more processors, cause the computer system to modify the at least one attribute of the one or more attributes of network traffic used based at least in part on a machine learning algorithm.

15. The set of one or more non-transitory computer-readable storage media of claim 13, wherein the instructions further comprise instructions that, as a result of being executed by the one or more processors, cause the computer system to update the network topology such that network traffic is provided to the service endpoint, such that a route of the network traffic lacks a network hop including the first lower tier routing device.

16. The set of one or more non-transitory computer-readable storage media of claim 13, wherein the instructions that cause the computer system to obtain the throttling trigger further include instructions that cause the computer system to obtain a negative acknowledgment from the service endpoint in response to network traffic provided to the service endpoint; and
wherein determining the one or more attributes of network traffic further includes determining the one or more attributes based at least in part on information included in the negative acknowledgment.

17. The set of one or more non-transitory computer-readable storage media of claim 13, wherein the instructions that cause the computer system to obtain the throttling trigger further include instructions that cause the computer system to determine a timeout interval for a response to network traffic has expired; and
wherein determining the one or more attributes of network traffic further includes determining the one or more attributes based at least in part on information in a request corresponding to the response.

18. The set of one or more non-transitory computer-readable storage media of claim 13, wherein the instructions further comprise instructions that, as a result of being executed by the one or more processors, cause the computer system to:
obtain a second throttling trigger from the service endpoint;
determine one or more additional attributes of network traffic associated with the second throttling trigger; and
reroute network traffic to the first lower tier routing device based at least in part on the one or more additional attributes.

19. The set of one or more non-transitory computer-readable storage media of claim 13, wherein the instructions that cause the computer system to determine the one or more attributes of network traffic further include instructions that cause the computer system to:
determine a type of request associated with the network traffic; and
update the network topology such that network traffic associated with the type of request is provided to the first lower tier routing device.

20. The set of one or more non-transitory computer-readable storage media of claim 13, wherein the instructions that cause the computer system to determine the one or more attributes of network traffic further include instructions that cause the computer system to:
determine a pattern associated with the network traffic, and
update the network topology such that network traffic associated with the pattern is provided to the first lower tier routing device.

* * * * *